US007194017B2

(12) United States Patent
Hervey, Jr. et al.

(10) Patent No.: US 7,194,017 B2
(45) Date of Patent: Mar. 20, 2007

(54) VIRTUAL CELL MAPPING IN MACRODIVERSE WIRELESS NETWORKS WITH FREQUENCY HOPPING

(76) Inventors: Morris Marvin Hervey, Jr., 14642 Onyx Ct., Nevada City, CA (US) 95959; Ujjal Kumar Ghoshtagore, 43 Glendora Ave., Long Beach, CA (US) 90803; Archana Somasekhara, 1055 E. Evelyn Ave., #G 92, Sunnyvale, CA (US) 94086

(*) Notice: Subject to any disclaimer, the term of this patent is extended or adjusted under 35 U.S.C. 154(b) by 0 days.

(21) Appl. No.: 11/288,656

(22) Filed: Nov. 28, 2005

(65) Prior Publication Data

US 2006/0104334 A1 May 18, 2006

Related U.S. Application Data

(63) Continuation of application No. 09/962,944, filed on Sep. 24, 2001, now Pat. No. 7,010,015, which is a continuation-in-part of application No. 09/750,592, filed on Dec. 28, 2000.

(51) Int. Cl.
*H04B 1/713* (2006.01)

(52) U.S. Cl. ............... 375/132; 375/136; 375/137; 370/347

(58) Field of Classification Search ............ 375/132, 375/133, 134, 135, 136, 137; 370/347, 350, 370/480; 455/452
See application file for complete search history.

(56) References Cited

U.S. PATENT DOCUMENTS

| 5,425,049 | A | 6/1995 | Dent |
| 5,459,759 | A | 10/1995 | Schilling |
| 5,663,957 | A | 9/1997 | Dent |
| 5,729,538 | A | 3/1998 | Dent |
| 5,757,787 | A | 5/1998 | Dent |
| 5,757,789 | A | 5/1998 | Dent |
| 5,812,539 | A * | 9/1998 | Dent ............... 370/321 |
| 5,862,142 | A * | 1/1999 | Takiyasu et al. ...... 370/480 |
| 5,959,984 | A | 9/1999 | Dent |
| 6,005,884 | A | 12/1999 | Cook et al. |
| 6,031,863 | A | 2/2000 | Jusa et al. |
| 6,049,561 | A | 4/2000 | Pezzlo et al. |

(Continued)

FOREIGN PATENT DOCUMENTS

WO   WO 96/08119   3/1996

(Continued)

*Primary Examiner*—Dac Ha
*Assistant Examiner*—Jaison Joseph
(74) *Attorney, Agent, or Firm*—Berkeley Law & Technology Group, LLP (57) ABSTRACT

A communication system for communication with mobile stations through a plurality of base stations at macrodiverse locations and with frequency hopping (FH). Two or more adjacent base stations communicate with mobile stations in a region between the adjacent base stations using coordinated orthogonal frequency hopping sequences. The communication system operates with virtual cells formed of physical sectors from adjacent base stations. Where base stations each operate with three sectors, virtual cells use three adjacent sectors of three adjacent base stations, respectively, and the coordinated orthogonal frequency hopping sequences are used for the adjacent sectors of each of the virtual cells. For GSM, the coordinated orthogonal frequency hopping sequences in each virtual cell are defined by a single hopping sequence number (HSN) and a set of mobile allocation index offsets (MAIOs). Fast macrodiversity switching is employed in combination with FH.

13 Claims, 7 Drawing Sheets

U.S. PATENT DOCUMENTS

| | | |
|---|---|---|
| 6,084,865 A | 7/2000 | Dent |
| 6,094,575 A | 7/2000 | Anderson et al. |
| 6,112,094 A * | 8/2000 | Dent ................... 455/452.1 |
| 6,128,512 A | 10/2000 | Trompower et al. |
| 6,157,669 A * | 12/2000 | Kotzin ................... 375/132 |
| 6,246,713 B1 | 6/2001 | Mattisson |
| 6,434,184 B2 | 8/2002 | Lindsey |
| 6,466,138 B1 | 10/2002 | Partyka |
| 6,700,920 B1 | 3/2004 | Partyka |
| 6,826,406 B1 | 11/2004 | Vialen et al. |
| 6,831,913 B1 | 12/2004 | Vialen |
| 2002/0141479 A1 | 10/2002 | Garcia-Luna-Aceves |
| 2003/0026223 A1 | 2/2003 | Eriksson et al. |
| 2003/0174757 A1 | 9/2003 | Partyka |
| 2004/0246929 A1 | 12/2004 | Beasley et al. |

FOREIGN PATENT DOCUMENTS

| | | |
|---|---|---|
| WO | WO 98/36509 | 8/1998 |
| WO | WO 98/48529 | 10/1998 |
| WO | WO 98/54850 | 12/1998 |
| WO | WO 99/13652 | 3/1999 |
| WO | WO 00/60892 | 10/2000 |
| WO | WO 00/76251 | 12/2000 |

* cited by examiner

VIRTUAL CELL MAPPING IN MACRODIVERSE WIRELESS NETWORKS WITH FREQUENCY HOPPING

CROSS-REFERENCE TO RELATED APPLICATIONS

This application is a continuation of U.S. patent application Ser. No. 09/962,944 filed Sep. 24, 2001, now U.S. Pat. No. 7,010,015 issued Mar. 7, 2006, which is a continuation-in-part of the application entitled SYSTEM FOR FAST MICRODIVERSITY SWITCHING IN MOBILE WIRELESS NETWORKS, SC/Ser. No. 09/750,592 by Bhupal Kanaiyalal Dharia, Gopal Chillariga, Ujjal Kumar Ghoshtagore, Rohit Kaushal, Gerhard Albert Koepf and Lance Kazumi Uychara, filed Dec. 28, 2000.

BACKGROUND OF THE INVENTION

The present invention relates to the field of mobile wireless communication systems and more specifically to methods and apparatus for communication with mobile telephone users (cellular and personal communication systems), mobile wireless data communications, two-way paging and other mobile wireless systems.

In a mobile wireless network, mobile stations (MS) are typically in communication with one base transceiver station (BTS), or more simply base station (BS), through up and down radio links. Such ground-based radio links suffer from strong local variations in path loss mainly due to obstructions and line-of-sight attenuation. As MSs move from locations to locations, their signal path losses go through shadow fading fluctuations that are determined, among other things, by the physical dimension of obstructions, antenna heights and MS velocities. These variations in path loss must be taken into account in the design of the uplink and downlink radio link resource allocation.

While communicating with a specific home BS, MSs are frequently within the communications range of other BSs. Statistically, due to the distribution of physical obstructions, the shadow fading path loss fluctuations to such other BS tend to be only weakly correlated with the path loss fluctuations on the link between the MS and home BS. Frequently, an MS, at any one time and location, has a lower path loss to a different BS than the serving BS with which it is communicating.

In high capacity wireless networks, efficient use of spectrum resources is of utmost importance. Dividing network layouts into ever smaller cells and tightening up frequency reuse increases spectrum efficiency but cannot be applied, as a practical matter, everywhere. Prior studies on frequency reuse in wireless networks using time division multiplexing, such as GSM, show that frequency hopping (FH) can be used to randomize interference. Frequency hopping improves the carrier-to-noise/interference-ratio of radio links and decreases the frame erasure rate (FER). Thus, frequency hopping allows the loading factor in a network to be increased without increasing bandwidth. The benefits of frequency hopping become more pronounced as the pool of frequencies used in a region is increased.

For a set of n given frequencies, GSM allows 64×n different hopping sequences that are determined by the MAIO (Mobile Allocation Index Offset) and the HSN (Hopping Sequence Number). The MAIO may have as many values as the number of frequencies in the set and the HSN may take 64 different values. Two channels bearing the same HSN but different MAIOs never use the same frequency on the same burst. Two channels using the same frequency list and the same time slot with different HSNs, interfere randomly for $1/n^{th}$ of the bursts. The sequences are pseudo-random, except for the special case of HSN=0, where the frequencies are used one after the other in order. Pseudo-random sequences have statistical properties similar to random sequences.

Usually, channels in one cell use the same HSN and different MAIOs since it is desirable to avoid interference between channels in a cell. If adjacent cells use the same frequency set, they are can be interfering. In cells using the same frequency set, different HSNs are used in order to gain from interference diversity. In GSM, the common channels (FCCH, SCH, BCCH, PAGCH and RACH) use a fixed frequency and hence do not use frequency hopping. Frequency hopping is limited to the traffic channels.

Fast macrodiversity switching (FMS), as described in the above-identified cross-referenced applications, improves carrier-to-noise/interference-ratio in networks where shadow fading, or slow fading, is present by adaptively switching radio channels to the path with the lowest path loss.

Networks suitable for using FH or FMS typically consist of multiple geographically distributed, that is macrodiverse, receivers ("collector resources") and transmitters ("broadcaster resources") and multiple mobile stations that communicate with collector resources on uplinks and with transmitter resources on downlinks. Frequently, collector and transmitter resources are co-located in base stations (BS). Furthermore, multiple BSs communicate with one or more base station controllers (BSCs) which in turn are connected via communications links with the Public Switched Telephone Network, with the Internet and/or with other facilities.

According to the above-identified cross-referenced applications, mobile users in FMS enabled networks may be communicating on uplink and downlink traffic channels with more than one BS. In GSM, a traffic channel is defined as having a specific time slot and carrier frequency. Initially, an MS call is setup with one of the multiple BSs. This BS is called the home BS ($_hBS$) for the call. When during the course of the communications, the radio link path-loss between a particular mobile station, MS, and its $_hBS$—due to a shadow fading event—becomes higher than the path loss between the particular MS and another BS belonging to a set of assisting BSs ($_aBS$) for the particular MS, the traffic channel is switched from the $_hBS$ to an $_aBS$. This $_aBS$ then becomes the serving BS for the MS, typically at least for the duration of the shadow fading event.

When an MS is served by an $_aBS$ during FMS operation, the $_aBS$ communicates with the MS on the same radio channel that was established for the $_hBS$. Such communications may disturb the network frequency plan and may lead to an undesirable change in the interference environment. This change in the interference environment can occur in all FMS enabled networks, including those using FH, and tends to be independent of the frequency reuse plan.

Frequency hopping has been found to be most beneficial in 1/3 and 1/1 frequency reuse plans. In both these reuse plans, all available traffic channels are used by every BS in the network. In 1/3 frequency reuse plans, the pool of available frequencies is divided into three frequency sub-pools, and one such frequency sub-pool is assigned to each of three sectors in every BS. The one or more radio resources in each sector share the frequency sub-pool assigned to the sector using frequency hopping for all time slots. Cyclical or random frequency hopping may be applied, both with the objective to avoid the simultaneous or overlapping transmission of bursts within a sector using the same frequency. Such simultaneous or overlapping transmissions of bursts at one frequency (co-channel bursts) are called collisions (co-channel interference). Furthermore, the frequency hopping sequences in each sector are designed to minimize simultaneous or overlapping transmission of bursts in adjacent frequency channels (adjacent channel interference).

In 1/1 frequency reuse, the entire pool of available traffic radio channels is used by all radio resources in all sectors of all BSs. To minimize collisions between traffic channels in different BSs, each BS is assigned one specific frequency hopping sequence (FHS). All radio resources within the three sectors of a BS use the same FHS. To avoid collisions between the traffic channels within the BSs, each radio resource is assigned one specific mobile allocation index off-set (MAIO). These MAIOs are chosen such that the hopping sequences of all radio resources are orthogonal, thereby avoiding collisions between traffic channels in the BSs. The FHS assigned to the plurality of BSs are not orthogonal. Therefore, collisions may occur between traffic channels used in different BSs.

By way of one example, in a network with 1/1 frequency reuse, a mobile station, $MS_i$ communicating on a traffic channel, $TCH_i$, with a base transceiver station, $BS_i$, using hopping sequence, $FHS_i$, and offset, $MAIO_i$, can have collisions with another mobile station, $MS_j$, communicating on traffic channel, $TCH_j$, with base transceiver station, $BS_j$, using hopping sequence, $FHS_j$, and offset, $MAIO_j$. When such collisions happen, $MS_i$ and $MS_j$ receive simultaneous or overlapping downlink bursts from $BS_i$ and $BS_j$ at the same frequency. Likewise, $BS_i$ and $BS_j$ receive uplink bursts at the same frequency. Depending on the alignment of the downlink bursts in time, and depending also on the relative signal power levels at the $MS_i$ and $MS_j$ locations, the mobile stations may not be able to detect one or more bursts correctly. Similarly, the $BS_i$ and $BS_j$ may not be able to detect bursts correctly dependent on alignment and power levels of received bursts.

This problem is exacerbated when FMS and FH are employed in the same environment. In the above example, when a BS is a home $_hBS_i$ for $MS_i$, $BS_j$ is a home $_hBS$ for $MS_j$, and when during a shadow fading event, $BS_j$ becomes the assistant serving $_aBS$ for $MS_i$, collisions occur between the traffic channel $TCH_j$, used for communications with $MS_j$ being served by $BS_j$, and traffic channel $TCH_i$, used for communications with $MS_i$, also served by $BS_j$.

While many different wireless networks have been proposed, there is a need for improved wireless networks that achieve the objectives of improved performance and higher density of MSs, particularly when both FH and FMS are employed.

SUMMARY

The present invention is a communication system for communication using wireless signals including downlink signals to and uplink signals from mobile stations through a plurality of base stations. A hopping sequence controller controls the frequency hopping sequences used by the base stations and operates to control two or more adjacent base stations whereby mobile stations in a region between the adjacent base stations communicate using coordinated orthogonal frequency hopping sequences.

The communication system operates with virtual cells formed of physical sectors from the macrodiverse base stations. For base stations each operating with three sectors, virtual cells use three adjacent sectors of three adjacent base stations, respectively, and the coordinated orthogonal frequency hopping sequences are used for the adjacent sectors of each of the virtual cells. Typically, the coordinated orthogonal frequency hopping sequences in each virtual cell are defined by a single hopping sequence number and a set of mobile allocation index offsets.

In a particular GSM embodiment, the base station controller and the hopping sequence controller use hopping sequence number (HSNs) and sets of mobile allocation index offsets (MAIOs) to control the frequency hopping sequences.

In various embodiments, portions of the communication system are distributed or centralized. Specifically, in one embodiment, hopping management means is distributed in each of the base stations and the hopping sequence control means is centralized in the base station controller.

Each of the base stations includes base station (BS) timing means for controlling the timing of communications with mobile stations and the communications system includes base station controller (BSC) timing means for synchronizing the timing of each of the BS timing means.

In one embodiment, the sectors have optimized sector antennas with sharp cutoffs at sector boundaries whereby interference from adjacent sectors is minimized.

In one embodiment, the communication system uses both fast macrodiversity switching (FMS) and frequency hopping (FH) for the wireless signals to and from the mobile stations. For fast macrodiversity switching, the base stations employ broadcast channels and dedicated channels for communications with the mobile stations. A manager controls fast macrodiversity switching of dedicated channels among the mobile stations while broadcast channels remain unswitched.

The fast macrodiversity switching dynamically switches radio links used for traffic and control channels for a mobile station among a number of base stations (BS) without changing the radio resource, and uses the same frequency hopping sequence and time slot combination in a TDMA embodiment.

The fast macrodiversity switching (FMS) among base stations (BSs) is under control of FMS managers. Each BS includes or is otherwise associated with a base station manager where a home BS has its BS manager (designated as a home BS manager) and assistant BSs have their BS managers designated as assistant BS managers.

The control by the home and assistant BS managers for FMS includes switching downlink signals to and uplink signals from mobile stations among base stations which include broadcast channels (non-switched) and dedicated (switched) channels. The base stations are dynamically selected to provide the dedicated channels for the mobile stations separately from the transceiver base stations providing broadcast channels for the mobile stations.

The foregoing and other objects, features and advantages of the invention will be apparent from the following detailed description in conjunction with the drawings.

DETAILED DESCRIPTION

Figure 1:
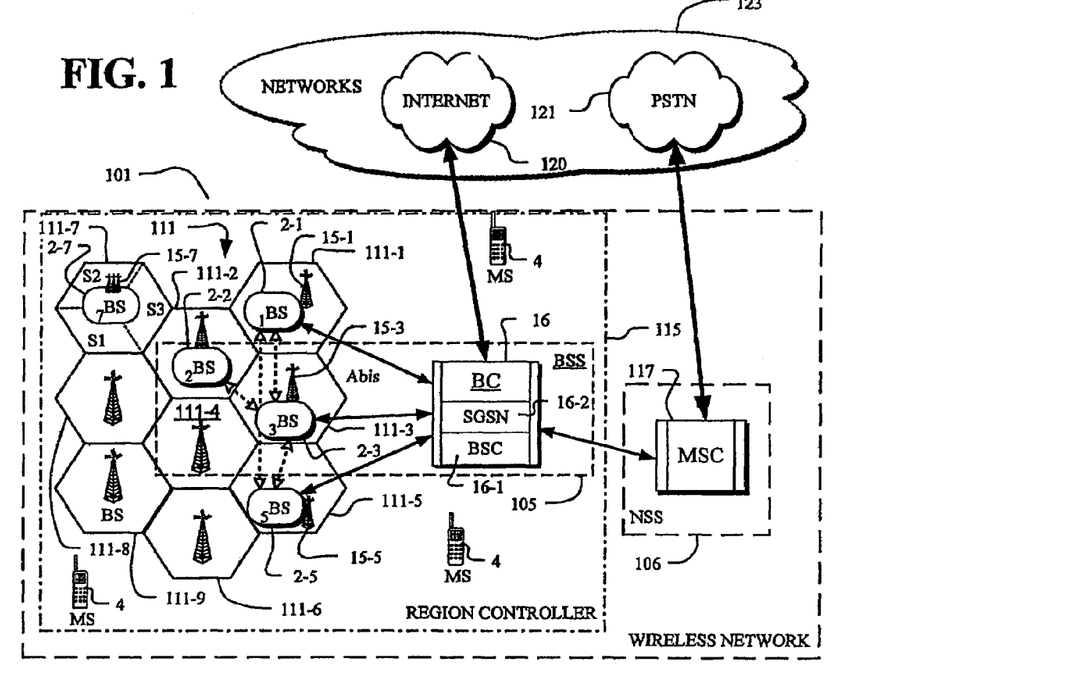
FIG. 1 depicts a wireless network formed of multiple base stations (BSs).

FIG. 1 depicts a mobile wireless network 101 including base stations 2 that have downlinks and uplinks to a base controller 16. These links are typically cabled links such as T1/E1 lines. The base controller 16 is formed of a base station controller (BSC) 16-1 and a Serving GPRS Support Node (SGSN) 16-2. The BSC 16-1 controls the assignment of the radio link resources and the operation of the network and has an interface, through the mobile switching center (NSC) 117, with the Public Switched Telephone Network (PSTN) 121 of networks 123. The SGSN 16-2 is primarily responsible for mobility management in GPRS and detects mobile stations in the local area for the transmission and receipt of packets. Additionally, it locates and identifies the status of mobile stations and gathers crucial call information. The SGSN operates with standard network interfaces and capabilities for the transport of IP using Frame Relay and ATM over physical interfaces.

In FIG. 1, the base controller (BC) 16 including the base station controller (BSC) 16-1 and the SGSN 16-2 are part of the base station system (BSS) 105. The BSC 16-1 communicates with the base stations (BS) 2 within the cells 111 of the wireless network 101, including cells 111-1, 111-2,111-3, . . . , 111-9. The cells 111-1, 111-2, 111-3, 111-5 and 111-7 are shown in expanded detail to include the base stations (BS) 2-1, 2-2, 2-3, 2-5 and 2-7, respectively.

In FIG. 1, the mobile stations (MSs) 4 are mobile within the cell region 111 and can move, for example, between the cells 111-1, 111-3 and 111-5. Furthermore, any one or more of the cells in cell region 111 may be sectored as shown for example with cell 111-7 which is partitioned into three sectors, S1, S2 and S3 where each sector operates with the same frequencies (for example, with 1/1 frequency reuse) or with different frequencies (for example, with 1/3 reuse) that are used in the other sectors of the cell. As the MSs 4 move in the region 111, the control functions of the BC 16 and the BS are collectively part of a region controller 115, which controls the operation of the wireless network 101. In FIG. 1, the MSC 117, part of a network and switching subsystem (NSS) 106, connects to the PSTN 121 within the networks 123. Similarly, the SGSN 16-2 of the BC 16 connects directly to the Internet 120 of the networks 123.

In the wireless mobile network 111 of FIG. 1, when a connection to a BTS is setup for an MS, the BSC selects the BTS that has the best radio access to the MS. This setup process includes a series of signal transmissions back and forth between the BSC, the BTSs, and the MS using uplink and downlink radio control channels and results in the assignment of specific radio traffic channels for the uplink and downlink between the MS and the BTS. Once this connection is set-up, user traffic is transmitted between the MS and the BSC. While the connection lasts, the BTS/BSC controls the operation of the radio traffic channels, including power control, frequency hopping, and timing advance while it continues to use the radio control channels for operation, maintenance and signaling with all the other MSs in the cell.

In the wireless mobile network 111 of FIG. 1, broadcast channels and non-broadcast channels are separate. Non-broadcast channels include dedicated control and traffic channels specific to an MS. Broadcast channels are used for signaling and control messages shared by all MSs within the cell, including MSs that are not in use for carrying traffic. Broadcast and non-broadcast channels are carried over radio control links. Traffic channels are used to transport user signals, also called payload, which can be voice or data. Dedicated control and traffic channels are transported over radio links, set-up individually between a MS and a BTS. To ensure that all MSs within the cell have access to the control signals, the radio link for the broadcast channel is designed to be very reliable by using robust coding and modulation techniques and a high transmit power level.

In the wireless network 111 of FIG. 1, non-broadcast channels serve individual MSs and are at times operated at lower power levels. For instance, MSs close to a BS do not require large transmit power levels and are operated at the minimum level meeting the link quality requirements. The reason for reducing power is to conserve radio band resources to enable reuse of radio resources in as many cells in the network as possible. MSs sharing uplink radio resources generate co-channel interference at their respective BSs and BSs sharing downlink radio resources generate co-channel interference at their respective MSs.

Shadow fading imposes large fluctuations on the path loss between a particular MS moving in a cell and its serving BTS. At times when the path loss to the BTS is high, a high transmit power is used to maintain the quality of service. At such times, it is likely that the path loss between the particular MS and another BTS is lower because shadow fading effects between a MS and different BTSs are not highly correlated. Therefore, such other BTS can communicate traffic and/or control signals with the particular MS using lower uplink and downlink power levels. By switching the traffic and/or control channel over to such other BS, the contribution of the particular radio link to the interference level in the network for other MS-BS links that use the same radio resources is reduced. When such traffic switching is implemented for many radio links in a network, a larger number of links can be operated in the network increasing network capacity without adding radio bandwidth.

In FIG. 1, the network includes cells shown with a schematic hexagonal cell layout where for each cell 111a corresponding base station (BS) and corresponding sectors (S{s}) are present. A typically cell 111-7 has a base station 2-7 and sectors S1, S2 and S3 implemented using three antennas 15-7, one per sector, that are typically co-located at the base station 2-7. In one example of the system of FIG. 1, a 1/1 frequency reuse plan is employed in which every sector uses the same set of frequencies F{i}. The system also employs frequency hopping (FH) of the MS-BS channels. The system controls and manages the user channel frequency hopping through the use and assignment of a Hopping Sequence Number (HSN) from the set of Hopping Sequence Numbers, HSN{n}, and a Mobile Allocation Index Offset (MAIO) from the set of Mobile Allocation Index Offsets, MAIO{k}, to each individual user channel between the BS and the MS. The BSC 16-1 provides the management and control of the HSN and MAIO indices. Although FIG. 1 is described in connection with three-sectored BSs and a GSM type of frequency hopping, the principles are applicable to other antenna sectorizations and to other frequency hopping methods.

In conventional operation, the system of FIG. 1 does not employ synchronization between cells and thus TDMA bursts and frequency hopping of user channels in one cell are not synchronized with those in other cells. This absence of time synchronization limits the capacity of conventional 1/1 frequency reuse plans. In synchronized operation, the system of FIG. 1 operates to establish synchronization between BSs in order to enable TDMA bursts and user channels in one cell to be synchronized with those in other cells. The synchronized operation enables fast macrodiversity switching (FMS) and coordinated orthogonal frequency hopping (COFH). The coordinated orthogonal frequency hopping is implemented using virtual cells in which macrodiverse sectors from different base stations employ the same coordinated orthogonal frequency hopping sequences.

Implementation of virtual cell operation with coordinated orthogonal frequency hopping sequences requires additional functionality relative to conventional 1/1 frequency reuse systems. For coordinated orthogonal frequency hopping (COFH), TDMA burst time synchronization is performed across the network. The synchronization allows all user bursts, across the entire cellular system, to occur simultaneously, with the same time reference. Without synchronization, user TDMA bursts drift in time relative to one another precluding the possibility of frequency hopping management. To achieve the synchronized timing, the BSs have accurate time references such as GPS or other methods to determine when to begin and end the TDMA bursts according to a common timing reference.

A particular embodiment of virtual cell operation with coordinated orthogonal frequency hopping is described for GSM networks. GSM provides for orthogonal frequency hopping in a conventional cell by assignment and management of the HSN and MAIO indices employed in the GSM frequency hopping algorithm. Calculation of the current hop frequency, using the algorithm, for a given MS also requires knowledge of the current GSM frame number (FN). The use of the current FN provides a common starting point in time for the frequency hopping algorithm, that is, manages the frequency hopping algorithm for all users in the conventional cell. The BSC is also charged with communicating the current FN and HSN/MAIO appropriate for each user link in every sector and site. As user links are activated and deactivated, the BSC manages the usage of the set of MAIO indices for each BS and each sector ensuring that no two users for a BS and cell are simultaneously using the same HS and MAIO.

Figure 2:
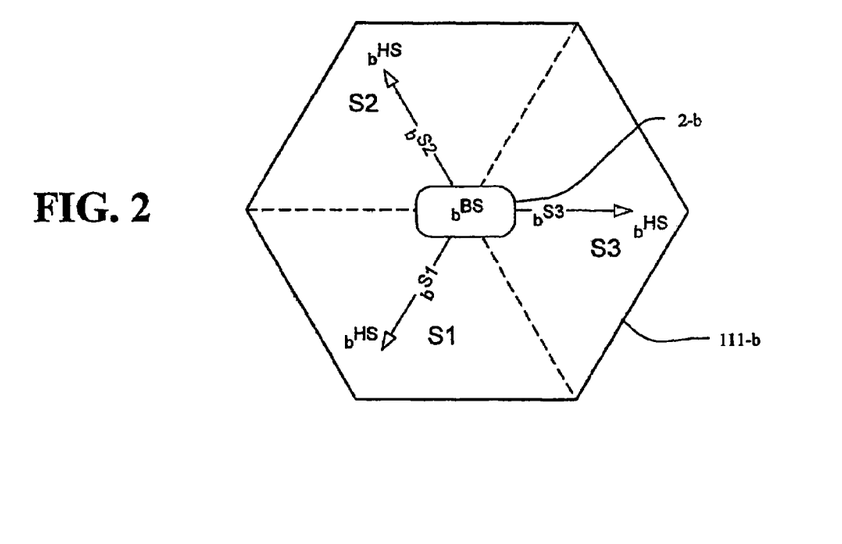
FIG. 2 depicts a single sectorized cell typical of the cells 111 of the system of FIG. 1.

FIG. 2 depicts a single sectorized cell 111-b typical of the cells 111 of the system of FIG. 1. The cell 111-b and the cells 111 of the system of FIG. 1 have different attributes and components depending upon the mode of operation, that is, conventional operation, fast macrodiversity switching (FMS) operation, coordinated orthogonal frequency hopping (COFH) operation or combinations thereof. In GSM hopping operation the cell 111-b uses a common set of n hopping frequencies, F{i}, where i: {1, . . . , n}, a common set of MAIO{k} where k: {0, . . . , (n−1)} and a unique HSN (Hopping Sequence Number) from the set of n Hopping Sequence Numbers, HSN{0, . . . , 63}. For simplicity in the drawings, the Hopping Sequence Number is represented as "HS" and for cell 111-b of FIG. 2 is represented for conventional operation as $_b$HS. For 1/1 operation, the same pool of frequencies represented by the set, F{i}, are available for assignment to mobile links in each of the sectors, S1, S2 and S3 of the cell 111-b as well as to the sectors in all other cells 111 of the FIG. 1 system. In FIG. 2, the base station 2-b has antennas and other sector components designated as $_b$S1, $_b$S2 and $_b$S3 for sectors S1, S2 and S3, respectively, that perform the communications in each sector.

Figure 3:
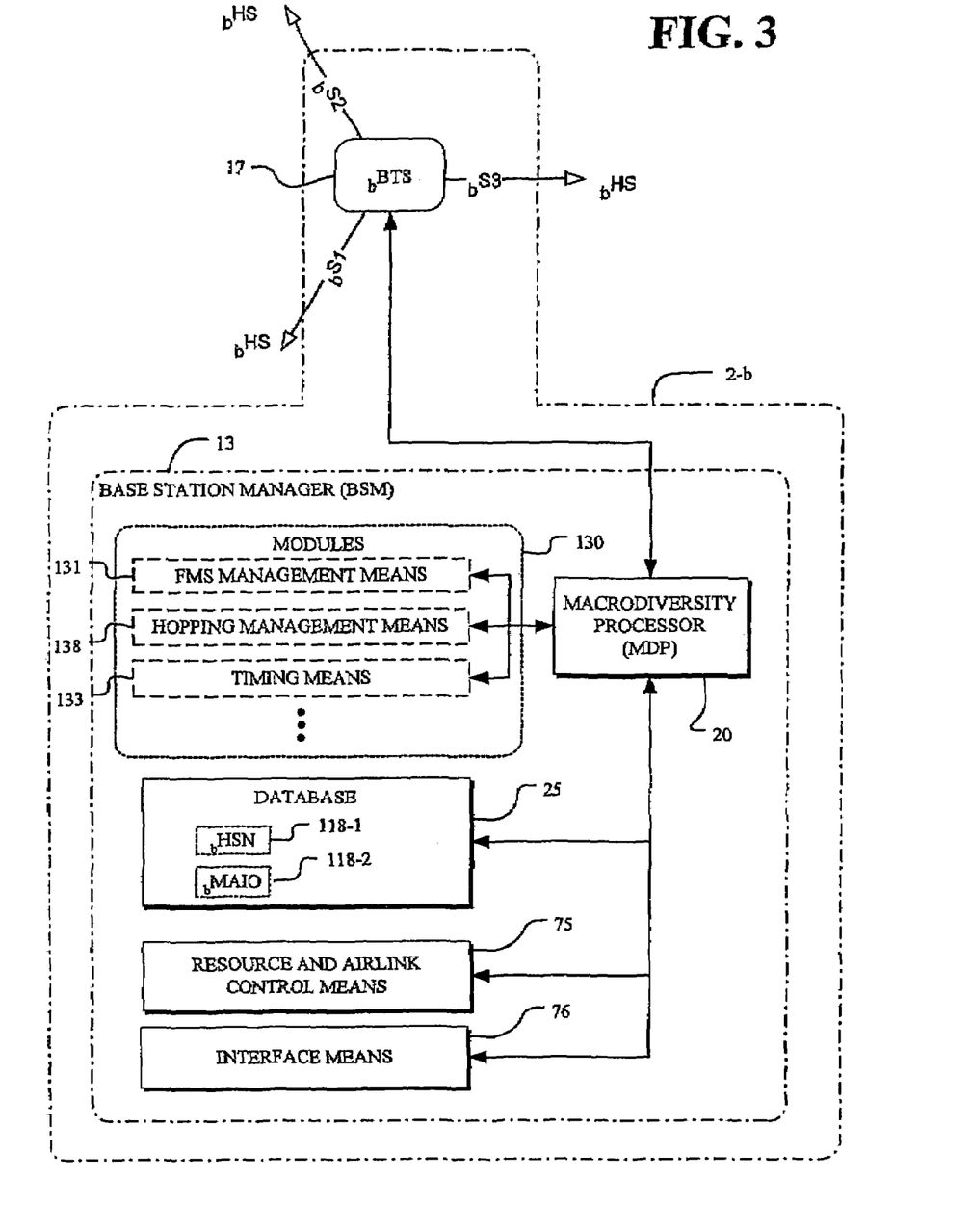
FIG. 3 depicts the details of a base station of FIG. 2 and is typical of the base stations of FIG. 1.

FIG. 3 depicts the details of the base station 2-b of FIG. 2. The base station 2-b includes components for conventional and new modes of operation, including fast macrodiversity switching (FMS) and coordinated orthogonal frequency hopping (COFH), and is typical of the base stations 2 of FIG. 1. The base station 2-b includes a base transceiver station 17-b ($_b$BTS) which includes the conventional functions and features of a base transceiver station in, for example, a conventional GSM system. The base transceiver station 17-b ($_b$BTS) has antennas and other sector components designated as $_b$S1, $_b$S2 and $_b$S3 for communication in the sectors S1, S2 and S3, respectively, of FIG. 2.

The base station manager 13-b includes a macrodiversity processor 20 (MDP), includes functional modules 130, includes database 25 for storing base station information, includes resource and airlink control means 75 and includes interface means 76 interfacing communications among base stations 2 and the BSC 16-1 of FIG. 1.

The resource and airlink control means 75 issues broadcaster commands for controlling the downlink signals to selected ones of mobile stations and collector commands for controlling the plurality of macro-diverse collectors for the uplink signals for selected ones of the mobile stations.

The macrodiversity processor (MDP) 20 is a processor for processing measurement, control, hopping sequence and other signals used in controlling the fast macrodiversity switching, frequency hopping and other operations of the base station 2-b for a set of MS. The functions performed by the macrodiversity processor 20 are determined in part by modules 130 including, for example, timing means 133, hopping management means 138 and hopping management means 138.

The base station manager 13 includes timing means 133 operating with the macrodiversity processor 20 for synchronizing the timing of base station 2-b with the other base stations 2 in the FIG. 1 system.

The base station manager 13 includes a hopping management means 138 operating with the macrodiversity processor 20 for receiving hopping information from the BSC and managing the frequencies used by the base station 2-b in communicating with MSs. In a GSM embodiment, the hopping management means 138 uses a hopping sequence number control 118-1 ($_b$HSN) and a sequence offsets 118-2 ($_b$MAIO) stored in database 25 for establishing hopping sequences.

The base station manager 13 includes a FMS management means 131 operating with the macrodiversity processor 20 for managing fast macrodiversity switching of dedicated channels served by the base station 2-b and switched among the other base stations 2 of FIG. 1. To perform the fast macrodiversity switching, the base station manager 13 uses algorithms to track information in real time and to provide resource contention resolution, for a home BS as well as for all assistant BS, for each MS. The base station manager 13 controls the information flow to other base station managers and the BSC of FIG. 1. In operation, the FMS management means 131 and the MDP 20 extract radio link quality measurements. These measurements are processed to determine when a need for fast macrodiversity switching services exists and what priority level is appropriate. The MDP 20 and FMS management means 131 determine which of the BSs is best suited to serve particular MSs. For FMS operation, the MDP 20 monitors the control channels. In the event of a MS or BSC originated handover, the MDP 20 may intervene with the handover process and continue fast macrodiversity switching services, or discontinue fast macrodiversity switching services. The fast macrodiversity switching makes it possible to reduce the MS and the BTS transmitter power levels. When implemented in an entire network, the lower power levels lead to a reduction in interference levels. Further, these reductions allow network operators to change the frequency reuse patterns and increase network capacity and/or throughput.

When frequency hopping (FH) is used in the network, home radio resources change the radio frequency used for bursts in accordance with a specific frequency hopping sequence (FHS). According to the GSM specifications, this operation is implemented during connection set-up by sending a channel activation message from the BSC to the home radio resource that includes hopping sequence information consisting of a hopping sequence number (HSN) and a MAIO assignment for the radio resource on the particular time slot. Based on this hopping sequence information, the radio resource determines its frequency hopping sequence. This same channel activation messages are used by the BSS when FMS is enabled in the network.

According to different situations, there is a difference in the way the channel activation message is transmitted to the radio resources depending on the type of radio resource. For home radio resources, the channel activation message is sent from the BSC to the home radio resource directly. No intervention by the BSM other than extraction of the HS information from the channel activation message and storage in the data base is needed. However for guest radio resources in any of the BSs, a different activation process is used. Guest radio resources in any particular BS are shared by other BSs, that temporarily use the particular BS as an assistant BS and temporarily use the guest radio resource in the $_a$BS instead of a home radio resource in the $_h$BS. Therefore, the guest radio resource hopping sequence $_g$HS in an $_a$BS is the same as the home radio resource hopping sequence $_h$HS used in the $_h$BS for any particular MS. The $_h$HS information has been stored in the $_h$BSM requesting the use of the guest radio resource during connection set-up. It is transmitted by the $_h$BSM to the $_a$BSM where the guest radio resource is located via the BSM to BSM link during a request for the use of the guest radio resource. The $_a$BSM receiving the request stores the $_h$HS information in its data base as a $_g$HS and sends it to the guest radio resource in a channel activation message upon activating the resource.

Therefore, according to the embodiments of the invention, it is a capability of $_h$BSMs to intercept channel activation messages during connection set-up and during handovers. It is another capability of base station managers to extract from these channel activation messages, $_h$HS information for all active home radio resources located in the $_h$BS. It is yet another capability of $_h$BSMs to transmit, over the BSM to BSM links, $_h$HS information for guest radio resources to $_a$BSs via $_a$BSMs. It is a capability of $_a$BSMs to store in their data-bases, $_h$HS information from other BSs as $_g$HS information.

Figure 4:
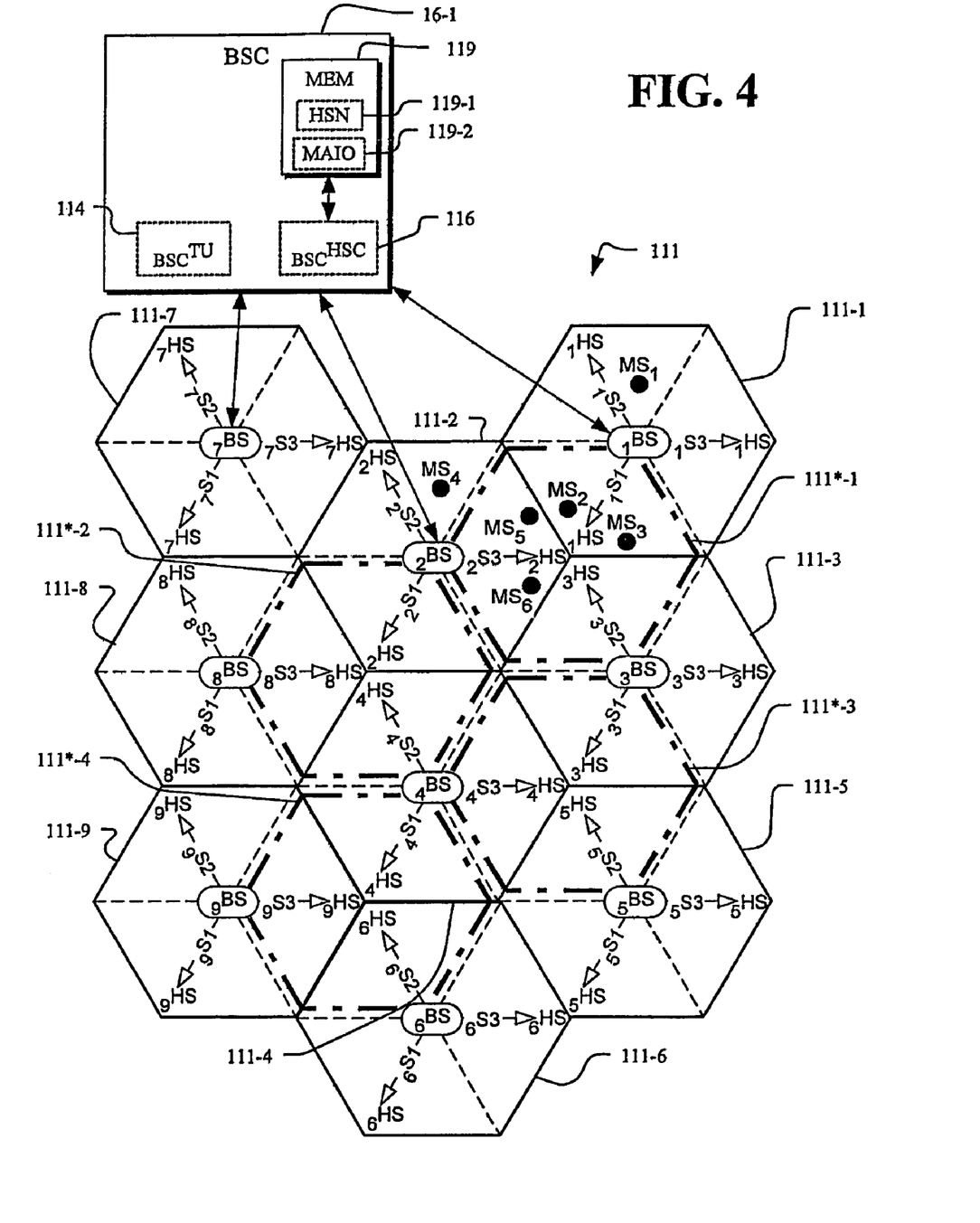
FIG. 4 depicts the cells of FIG. 1 shown in expanded detail with each cell having three sectors and a base station like that shown in FIG. 2.

FIG. 4 depicts the cells 111 of FIG. 1 shown in expanded detail with each cell having three sectors and a base station like that shown in FIG. 2. The cells 111 include the cells 111-1, 111-2, . . . , 111-9 including the base stations $_1$BS, $_2$BS, . . . , $_9$BS, respectively, having sector components designated as $_1$S1, $_1$S2 and $_1$S3; $_2$S1, $_2$S2 and $_2$S3; . . . ; $_9$S1, $_9$S2 and $_9$S3, respectively. In conventional operation, each of the sectors in a given cell such as cells 111-1, 111-2, . . . , 111-9 operates with the same hopping sequence number (HSN) designated as $_1$HS, $_2$HS, . . . , $_9$HS, respectively, in FIG. 4. The base stations $_1$BS, $_2$BS, . . . , $_9$BS each connect to the base station controller (BSC) 16-1. The BSC 16-1 controls the assignment of the radio link resources and the operation of the cells 111 forming the wireless network. The cells 111 operate to communicate with mobile stations MS including the mobile stations $MS_1$, $MS_2$, $MS_3$, $MS_4$, $MS_5$ and $MS_6$, shown as typical. The cells 111-1, 111-2, . . . , 111-9 are shown schematically in FIG. 4 as hexagons drawn with solid lines.

In FIG. 4, the base station controller (BSC) 16-1 includes a hopping sequence control 116 ($_{BSC}$HSC) for controlling the frequencies used for communicating with MSs. In a GSM embodiment, the $_{BSC}$HSC uses hopping sequence numbers 119-1 (HSN) and a sequence offset 119-2 (MAIO) stored in memory 119 for controlling the hopping sequences of base stations. In FIG. 4, the BSC timing unit 114, $_{BSC}$TU, and timing units in each of the base stations 2 (see timing unit $_b$TU in FIG. 2) is used for synchronizing base stations. However, when FIG. 4 is used in a conventional mode, no synchronizing is required.

The mobile stations $MS_1$, $MS_2$ and $MS_3$ are located in cell 111-1 serviced by base station $_1$BS with the sector antennas and other components $_1$S1, $_j$S2 and $_1$S3. In FIG. 4, mobile station $MS_1$ is located in sector S2 and typically is best served by base station $_1$BS sector components $_1$S2 while mobile stations $MS_2$ and $MS_3$ are located in sector S1 and typically are best served by sector components $_1$S1. In conventional GSM operation, all of the mobile stations $MS_1$, $MS_2$ and $MS_3$ are served with the same hopping sequence number (HSN) designated as $_1$HS and related MAIOs.

The mobile stations $MS_4$, $MS_5$ and $MS_6$ are located in cell 111-2 serviced by base station $_2$BS with the sector antennas and other components $_2$S1, $_2$S2 and $_2$S3. In FIG. 4, mobile station $MS_4$ located in sector S2 and typically is best served by base station $_2$BS sector components $_2$S2 while mobile stations $MS_5$ and $MS_6$ are located in sector S3 and typically are best served by sector components $_2$S3. In conventional operation, all of the mobile stations $MS_4$, $M4_5$ and $MS_6$ are served in conventional GSM operation with the same hopping sequence number (HSN) designated as $_2$HS and related MAIO.

In FIG. 4, the mobile stations $MS_2$, $MS_3$, $MS_5$ and $MS_6$ are located in an interference region **111\*-1** that is the intersection of the regions served by sector components $_1$S1, $_2$S3 and $_3$S2 of the base stations $_1$BS, $_2$BS and $_3$BS, respectively, that in turn use hopping sequence numbers $_1$HS, $_2$HS and $_3$HS, respectively. Because different and therefore not orthogonal hopping sequence numbers are in use, this region is susceptible to interference resulting from frequency collisions when a particular frequency in use for a particular burst for one mobile station is the same as the a particular frequency in use for a particular burst for another mobile station. For purposes of explanation, mobile stations $MS_2$ and $MS_3$, conventionally served by base station $_1$BS with sector S1 components $_1$S1 using hopping sequence number $_j$HS, and mobile stations $MS_5$ and $MS_6$, conventionally served by base station $_2$BS with sector S3 components $_2$S3 using hopping sequence number $_2$HS, are selected for analysis and explanation.

The interference region 111*-1 where mobile stations $MS_2$, $MS_3$, $MS_5$ and $MS_6$ are located is typical of interference regions among the cells 111 of FIG. 4. Other interference regions 111*-2, 111*-3 and 111*4 are also shown in FIG. 4 in schematic form using short-long broken-line hexagons. The interference region 111*-2 is the intersection of the regions served by sector components $_2$S1, $_4$S2 and $_8$S3 of the base stations $_2$BS, $_4$BS and $_8$BS, respectively, that in turn use hopping sequence numbers $_2$HS, $_4$HS and $_8$HS, respectively. The interference region 111*-3 is the intersection of the regions served by sector components sector components $_3$S1, $_5$S2 and $_4$S3 of the base stations $_3$BS, $_5$BS and $_4$BS, respectively, that in turn use hopping sequence numbers $_3$HS, $_5$HS and $_4$HS, respectively. The interference region 111*-4 is the intersection of sector components $_4$S1, $_6$S2 and $_9$S3 served by the base stations $_4$BS, $_6$BS and $_9$BS, respectively, that in turn use hopping sequence numbers $_4$HS, $_6$HS and $_9$HS, respectively.

Figure 5:
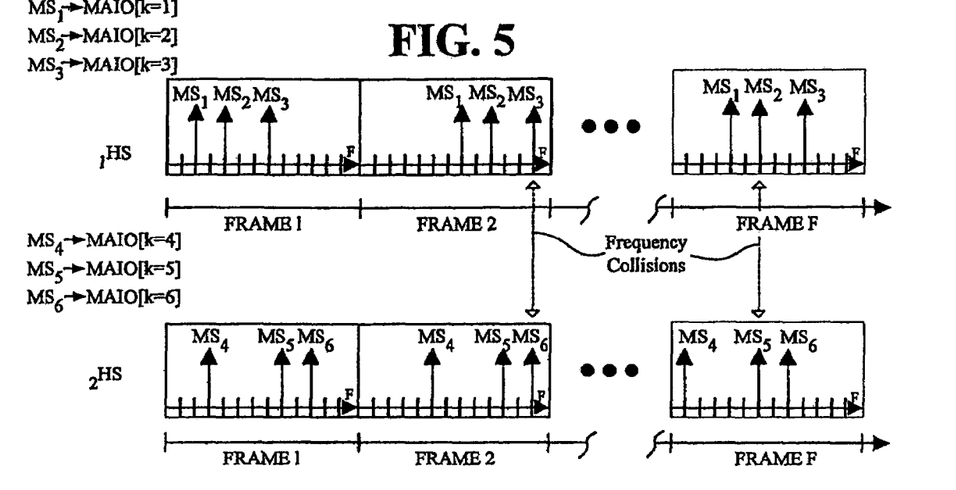
FIG. 5 illustrates conventional frequency hopping management in time, represented in user TDMA bursts in sequential frames and hopping frequency as determined according to MAIO offsets.

FIG. 5 illustrates frequency hopping management in time, represented in user TDMA bursts in sequential frames and hopping frequency as determined according to HSN and MAIO offsets. In FIG. 5, the frequencies for two hopping sequence numbers, $_1$HS and $_2$HS, represent the hopping sequences used by $_1$BS and $_2$BS of FIG. 4 in which MSs (for example, mobile stations $MS_1$, $MS_2$ and $MS_3$) served by $_1$BS are assigned unique indices from the set $_1$MAIO$\{k_1\}$ of indices and MSs (for example, mobile stations $MS_4$, $M_5$, and $MS_6$) served by $_2$BS are assigned unique indices from the set $_2$MAIO$\{k_2\}$ of indices. The hop frequencies for each of the unique indices of the set $_1$MAIO$\{k_1\}$ for the same hopping sequence number $_1$HS will not simultaneously occur within $_1$BS site. Similarly, the hop frequencies for each of the unique indices from the set $_2$MAIO$\{k_2\}$ for the same hopping sequence number $_2$HS will not simultaneously occur within the $_2$BS site. Such systems which realize this type of frequency hopping relationship among MSs are said to employ orthogonal frequency hopping; meaning that user MSs links employing the same HSN will never occupy the same frequency simultaneously. In the context of 1/1 frequency reuse and GSM systems, the set $_1$MAIO$\{k_1\}$ and the set $_2$MAIO$\{k_2\}$ are the same and hence for simplicity are identified as MAIO$\{k\}$ in FIG. 5.

In FIG. 5, the frequency hopping relationships are shown between $_1$BS and $_2$BS with different hopping sequence numbers $_1$HN and $_2$HS and with ones of the MAIO$\{k\}$. Comparison off the $_1$HS frequencies with the $_2$HS frequencies reveals that occasionally MSs do occupy the same frequency during the same TDMA burst that is, a frequency "collision" occurs which results in mutual interference for MSs using the same frequency in the same burst. Specifically, in burst n of FRAME 2 the frequency for $MS_3$ using $_1$HS and a particular one of the MAIO$\{k\}$, MAIO[k=3] is the same as the frequency for $MS_6$ using $_2$HS and MAIO [k=6]. Also, in FRAME F, the frequency for $MS_2$ using $_1$HS and MAIO[k=2] is the same as the frequency for $MS_5$ using $_2$HS and MAIO[k=5]. As is clear from FIG. 5, the frequency hopping relationship between MSs operating from different BSs with different hopping sequence numbers is non-orthogonal.

The interference resulting from frequency collisions of the type illustrated in FIG. 5 for downlink signals is undesirable since it results in a degradation of the voice/data link quality observed by the MSs. Similar interference results from frequency collisions of uplink signals and degradation of the voice/data link quality observed by BSs. The interference also sets a limit on the number of MS links which can be supported by a given BS site, that is, sets a limit on the cell capacity. As the number of MSs increases in a site and for a fixed set of hopping frequencies, the probability of frequency collisions increases resulting in an overall increase in interference and a decrease in voice link quality observed at MSs.

Figure 6:
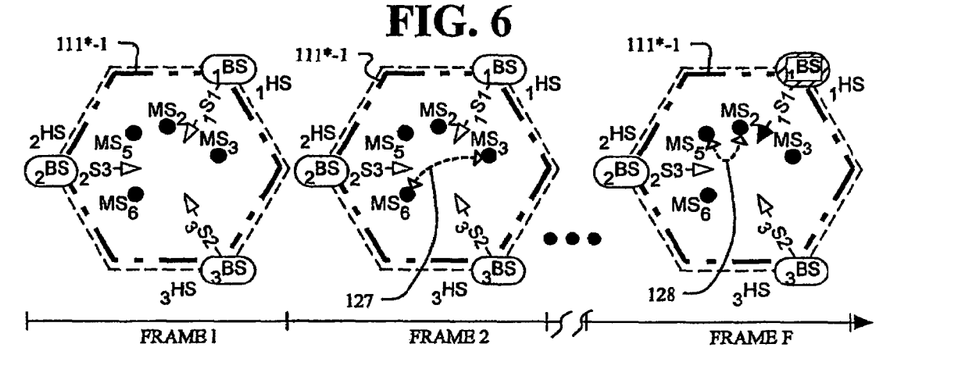
FIG. 6 depicts a detailed representation of an interference region of FIG. 4 with the frequency allocations described in FIG. 5 at a series of snapshots in time for sequential frames.

FIG. 6 depicts in detail a representation of the interference region 111*-1 of FIG. 4 with the frequency allocations described in FIG. 5 at a series of snapshots in time for frames FRAME 1, FRAME 2, . . . , FRAME F. Each snapshot represents the interference conditions for the same user time slots (TS) in the sequential frames. The interference mechanisms which arise when groups of MSs share a common MAIO set, but different hopping sequence numbers, as described in FIG. 5, are further illustrated in FIG. 6. The interference region 111*-1 includes three different hopping sequence numbers, namely, $_1$HS, $_2$HS and $_3$HS each serving groups of MSs with MSs in the same sector sharing a unique hopping sequence number and frequency and are differentiated by specific MAIOs. The resulting collisions as indicated in FIG. 5 occur in FIG. 6 with collision 127 (represented by a broken line) between $MS_3$ and $MS_6$ in FRAME 2 and collision 128 between $MS_2$ and $MS_5$ in FRAME F.

Figure 7:
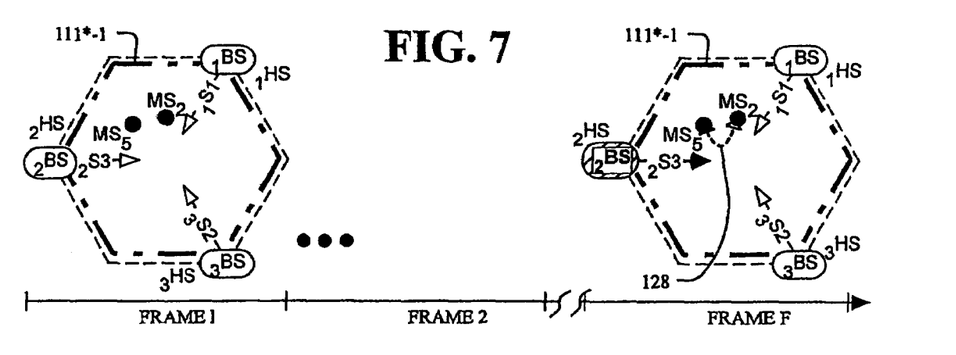
FIG. 7 depicts Fast Macrodiversity Switching (FMS) applied to the example of FIG. 5 and FIG. 6.

FIG. 7 represents an interference collision that occurs when Fast Macrodiversity Switching (FMS) is applied to the conventional example of FIG, 5 and FIG. 6. In FIG. 7, it is assumed that $MS_2$ served by $_1$BS using $_1$HS (indicated by cross-hatched $_1$BS in FIG. 6) has been switched under FMS control in FRAME 1 to be served by $_2$BS (indicated by cross-hatched $_2$BS in FIG. 7) still using $_1$HS. As indicated in FIG. 5 for FRAME F, $MS_2$ is at the sixth frequency under $_1$HS and collided with $MS_5$ at the sixth frequency under $_2$HS. The FMS switching as represented in FIG. 7 does not alter the frequency collision event that occurs without FMS switching as represented in FIG. 6, but can increase or decrease the intensity of the frequency collision.

Typically, under FMS control, an MS is switched from an old BS, $_1$BS in the example of FIG. 5, FIG. 6 and FIG. 7, to a new BS, $_2$BS in the same example, because the new BS has lower path loss than the old BS. When considered over a long observation interval during which one MS, for example $MS_a$, takes on all possible positions within the home sector, an FMS switch is equally likely to increase or reduce the interference level to another MS, for example $MS_b$, or any other MS in any sector. This phenomena applies to all MSs which are FMS switched. Hence, considering all the FMS switched MSs within the entire zone 111*-1 over a long period of time, the average interference level is unchanged, but the extremes of the interference ranges are larger because of the combination of FMS switching and frequency collisions. From a system wide performance perspective, an increase in the range of interference levels is undesirable because it means that MSs of the system more frequently experience an increase in interference level above a specified, but arbitrary, interference level.

Figure 8:
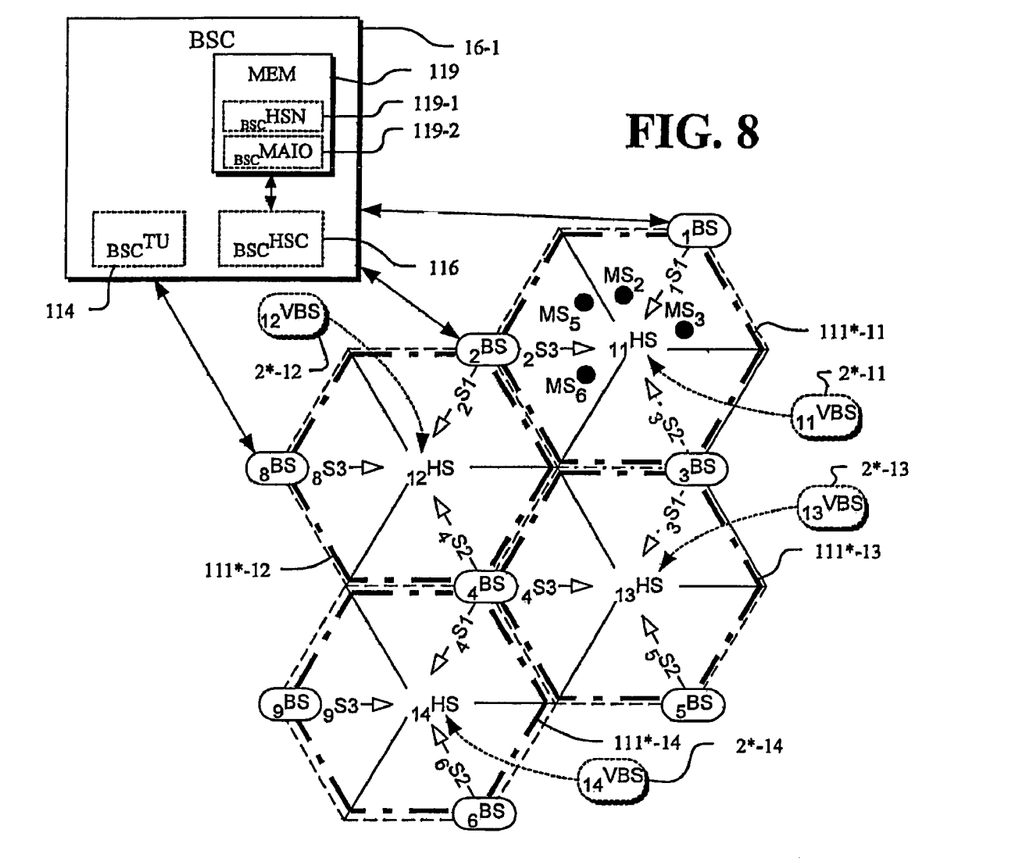
FIG. 8 depicts virtual cells that are used for frequency hopping management.

In FIG. 8, virtual cells 111* are used for improved frequency hopping management. The boundaries of physical cells 111 are schematically shown as solid-line hexagons or parts thereof (derived from FIG. 4) and the virtual cells 111* are shown as long-short broken-line hexagons. The hopping sequence numbers (HS) for the physical cells in FIG. 4 are mapped to different hopping sequence numbers for the virtual cells in FIG. 8 on a physical sector by sector basis. The interference regions 111* of FIG. 4 for the physical cells 111 are represented by long-short broken-line hexagons and include by way of example the interference regions 111*-11, 111*-12, 111*-13 and 1111*-14 and as a result of the mapping of the hopping sequence numbers, the interference regions in FIG. 4 become the virtual cells in FIG. 8.

In FIG. 8, the virtual cell 111*-11 is the union of the sector components $_1S1$, $_3S2$ and $_2S3$, that all use common hopping sequence number $_{11}HS$, served by the base stations $_1BS$, $_3BS$ and $_2BS$, respectively. The virtual cell 111*-12 is the region served by the union of the sector components $_2S1$, $_4S2$ and $_8S3$, that all use common hopping sequence number $_{12}HS$, served by the base stations $_2BS$, $_4BS$ and $_8BS$, respectively. The virtual cell 111*-3 is the region served by the union of the sector components $_3S1$, $_5S2$ and $_4S3$, that all use common hopping sequence number $_{13}HS$, served by the base stations $_3BS$, $_5BS$ and $_4BS$, respectively. The virtual cell 111*-4 is the region served by the union of the sector components $_4S1$, $_6S2$ and $_9S3$, that all use common hopping sequence number $_{14}HS$, served by the base stations $_4BS$, $_6BS$ and $_9BS$, respectively.

Within each virtual cell 111* of FIG. 8, all MS links share a common hopping sequence number (HS) index, but are assigned a unique MAIO index from the set of MAIO, MAIO{k=1, . . . , N}. Thus, all virtual cells are defined by a unique hopping sequence number (HS) index and a MAIO set of indices which are reused in every zone. These characteristics require that each physical BS site employ a different HSN index in each of its constituent sectors. This requirement is in contrast to the conventional 1/1 frequency reuse system which uses the same HSN index for each sector of a physical site.

In FIG. 8, time synchronization is established to allow MFS and COFH operation. For FMS, TDMA burst time synchronization is established. This synchronization is achieved by communications between the BSC timing unit 114, $_{BSC}TU$, and timing units in each of the base stations 2 (see timing unit $_bTU$ in FIG. 2) for each of the sectors in base stations 2. The synchronization allows all MS bursts, across the entire cellular system or any subset of cells 111 to occur simultaneously with the same time reference. To achieve the timing, the BSs have accurate time references and the BSC communicates to the BSs through operation of the BSC timing unit $_{BSC}TU$ when to begin and end the TDMA bursts.

In FIG. 8, the base station controller (BSC) 16-1 includes a hopping sequence control 116 ($_{BSC}HSC$) for controlling the frequencies used for communicating with MSs. In a GSM embodiment, the $_{BSC}HSC$ uses hopping sequence numbers 119-1 (HSN) and sequence offsets 119-2 (MAIOs) are stored in memory 119 for controlling the hopping sequences of base stations. In FIG. 8, the BSC timing unit 114, $_{BSC}TU$ and timing units in each of the base stations 2 (see timing unit $_bTU$ in FIG. 2 ) are used for synchronizing base stations when operating in FMS and COFH modes.

In FIG. 8, the virtual cells 111* are defined to be served by virtual base stations 2*, VBSs. In general, virtual base stations are defined to have the parameters set forth by the following Exp. (1):

$$_{L[b]}VBS[_{b1}S(s1), _{b2}S(s2), \ldots, _{bB}S(SS):: _{L[b]}HS:: _{L[b]}MAIO\{k_b\}] \quad \text{Exp. (1)}$$

where:

$_{L[b]}VBS$=the $L(b)^{th}$ one of virtual base stations, VBS $_{b1}S(s1), _{b2}S(s2), \ldots, _{bB}S(SS)$=the set of B physical antennas and components in the SS set of physical sectors used to form the virtual base station $_{L[b]}HS$=the hopping sequence number assigned to the $_{L[b]}VBS$ virtual base station $_{L[b]}MAIO\{k_b\}]$= the $k_b$ set of MAIO offsets available for assignment to mobile stations (MS) for the particular hopping sequence assigned to the $_{L[b]}VBS$ virtual base station When the virtual base stations as defined in Exp. (1) are configured in a conventional manner, as depicted in FIG. 4 for example, the virtual-equals-physical mode exists and b1=b2=, . . . , =bB in expression Exp (1). In the virtual-equals-physical example of FIG. 4, the number of sectors is 3 (SS=3) and therefore, Exp. (1) becomes, $$_bVBS[_bS1,_bS2,_bS3::_bHS::_bMAIO\{k_b\}] \quad \text{Exp. (2)}$$

where:

$_bVBS$=$b^{th}$ one of the physical base stations, BS $_bS(s1), _bS(s2), _bS(3)$=the set of 3 physical antennas and components in the 3 physical sectors used to form the base station $_bHS$=the hopping sequence assigned to all three sectors in the base station $_bMAIO\{k_b\}$= the $k_b$ set of MAIO offsets available for assignment to mobile stations (MS) for the $_bHS$ hopping sequence assigned to the base station The virtual-equals-physical Exp. (2) also applies to FIG. 2 where each base station $_bBS$ has three sector antennas $_bS1$, $_bS2$ and $_bS3$ that use some particular one, $_bHS$, of the available hopping sequences and each MS is assigned one of $k_b$ of the set of $_bMAIO\{k_b\}$ available, In FIG. 4, the nine physical cells 111-1, 111-2, . . . , 111-9 are served by the nine physical base stations 2-1, 2-2, . . . , 2-9 denominated as $_1BS$, $_2BS$, . . . , $_9BS$, respectively. Specifically, the nine physical cells are identified by the following TABLE 1:

TABLE 1

| $_bBS$ | $_bS1, _bS2, _bS3$ | $_bHS$ | $_bMAIO\{k_b\}$ |
|---|---|---|---|
| $_1BS$ | $_1S1, _1S2, _1S3$ | $_1HS$ | $_1MAIO\{k_1\}$ |
| $_2BS$ | $_2S1, _2S2, _2S3$ | $_2HS$ | $_2MAIO\{k_2\}$ |
| $_3BS$ | $_3S1, _3S2, _3S3$ | $_3HS$ | $_3MAIO\{k_3\}$ |
| $_4BS$ | $_4S1, _4S2, _4S3$ | $_4HS$ | $_4MAIO\{k_4\}$ |
| $_5BS$ | $_5S1, _5S2, _5S3$ | $_5HS$ | $_5MAIO\{k_5\}$ |
| $_6BS$ | $_6S1, _6S2, _6S3$ | $_6HS$ | $_6MAIO\{k_6\}$ |
| $_7BS$ | $_7S1, _7S2, _7S3$ | $_7HS$ | $_7MAIO\{k_7\}$ |
| $_8BS$ | $_8S1, _8S2, _8S3$ | $_8HS$ | $_8MAIO\{k_8\}$ |
| $_9BS$ | $_9S1, _9S2, _9S3$ | $_9HS$ | $_9MAIO\{k_9\}$ |

FIG. 8 depicts the virtual cells 111* of FIG. 4, including virtual cells 111*-11, 111*-12, 111*-13 and 111*-14 isolated from other parts of the cells of FIG. 4for easier reference and description. The virtual cells 111*-11, 111*-12, 111*-13 and 111*-14 of FIG. 8 are served by virtual base stations 2* including virtual base stations 2*-11, 2*-12, 2*-13 and 2*-14 denominated as $_{11}VBS$, $_{12}VBS$, $_{13}VBS$ and $_{14}VBS$, respectively. The virtual cells 111* and the virtual base stations 2* are denominated as virtual because they are formed of combinations of the sectors and sector antennas and other component parts of the physical cells 111 and physical base stations 2 of FIG. 4 and do not, therefore, necessarily have a separate physical existence.

Expression Exp. (1) above applies to the virtual base stations 2* of FIG. 8 as shown by the following TABLE 2 when using the physical sector antennas and elements $_{b1}S(s1)$, $_{b2}S(s2)$, $_{b3}S(s3)$ used in FIG. 4 and TABLE 1. In FIG. 8, the virtual base stations $_{11}VBS$, $_{12}VBS$, $_{13}VBS$ and $_{14}VBS$, are programmed such that the physical sector antennas and elements $_{b1}S(s1)$, $_{b2}S(s2)$, $_{b3}S(s3)$ from FIG. 4 when employed in FIG. 8 use different hopping sequences, namely, hopping sequences $_{11}HS$, $_{12}HS$, $_{13}HS$ and $_{14}HS$, respectively, and different offsets therefor, namely offsets $_{11}MAIO\{k_{11}\}$, $_{12}MAIO\{k_{12}\}$, $_{13}MAIO\{k_{13}\}$ and $_{14}MAIO\{k_{14}\}$. In GSM systems, the sets of offsets $_{11}MAIO\{k_{11}\}$, $_{12}MAIO\{k_{12}\}$, $_{13}MAIO\{k_{13}\}$ and $_{14}MAIO\{k_{14}\}$ are the same and hence for simplicity can be identified as MAIO{k} without subscripts.

TABLE 2

| $_{L(b)}VBS$ | $_{b1}S(s1), _{b2}S(s2), _{b3}S(s3)$ | $_{L(b)}HS$ | $_{L(b)}MAIO\{k_{L(b)}\}$ |
|---|---|---|---|
| $_{11}VBS$ | $_1S1, _3S2, _2S3$ | $_{11}HS$ | $_{11}MAIO\{k_{11}\}$ |
| $_{12}VBS$ | $_2S1, _4S2, _8S3$ | $_{12}HS$ | $_{12}MAIO\{k_{12}\}$ |
| $_{13}VBS$ | $_3S1, _5S2, _4S3$ | $_{13}HS$ | $_{13}MAIO\{k_{13}\}$ |
| $_{14}VBS$ | $_4S1, _6S2, _9S3$ | $_{14}HS$ | $_{14}MAIO\{k_{14}\}$ |

For purposes of explanation, the virtual cell and interference region **111\*-1 of FIG. 8 includes the same mobile stations $MS_2$, $MS_3$, $MS_5$ and $MS_6$ as were used in the example of FIG. 4 through FIG. 7**.

Figure 9:
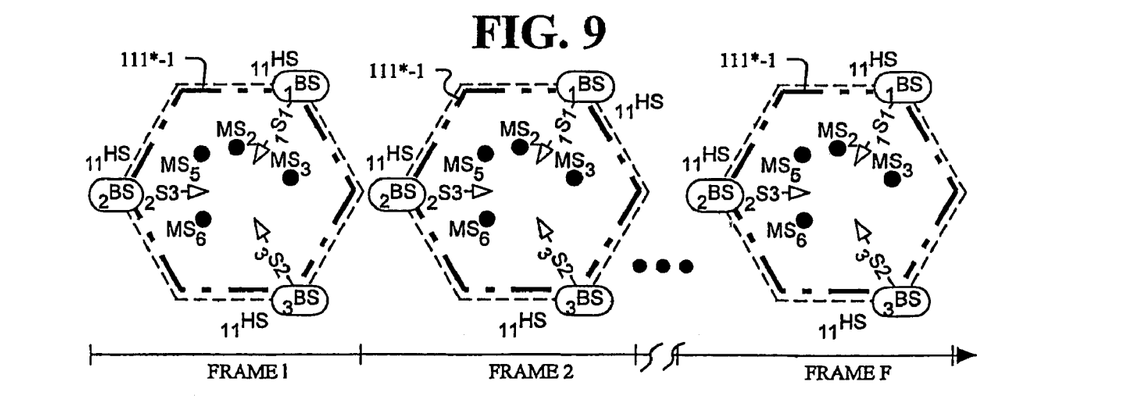
FIG. 9 depicts a detailed representation of a virtual cell of FIG. 8 with the a series of snapshots in time for sequential frames.

FIG. 9 depicts a detailed representation of a virtual cell 111* of FIG. 8 with a series of snapshots in time for sequential frames with or without FMS. In FIG. 9, no collisions occur since the MSs all have the same common hopping sequence number, $_{13}HS$, in the example described and are assigned a unique MAIO from the set $_{11}MAIO\{k_{11}\}$. The absence of frequency collisions in FIG. 9 contrasts sharply with the situation for FMS switching with conventional 1/1 frequency reuse. The conventional 1/1 frequency reuse (see FIG. 5, FIG. 6 and FIG. 7) produces a wide range of frequency collision interference during FMS switching which results in degraded system performance in terms of the interference levels observed by users.

Although virtual cell mapping of hopping sequences, in a 1/1 frequency reuse scenario is a significant improvement, it is not collision free. The principal cause of collisions in a given sector of a virtual cell is from user frequency hopping activity in adjacent virtual cells. Specifically, it is due to frequency collisions between user links operating in adjacent sectors of different virtual cells employing different hopping sequence number indices. The principles can be understood with reference to an example in FIG. 8. In FIG. 8, the physical base station $_4BS$, by way of example, includes the co-located sector components $_4S1$, $_4S2$ and $_4S3$, that all use the different hopping sequence numbers $_{14}HS$, $_{12}HS$ and $_{13}HS$, respectively. The sector component $_4S1$ using $_{14}HS$ and the sector component $_4S2$ using $_{12}HS$ represent adjacent sector interference for the sector component $_4S3$ using $_{13}HS$. The sources of the adjacent sector interference for any one of the sector components are the other two sector components.

Adjacent sector collisions are mitigated by two factors. First, the adjacent sector interference is attenuated by the directivity of the antenna radiation pattern employed at the interfering sector of the BS. Second, the adjacent sector interference is mitigated by close proximity of the signal and interfering sources so that they experience highly correlated shadow fading attenuation.

Figure 10:
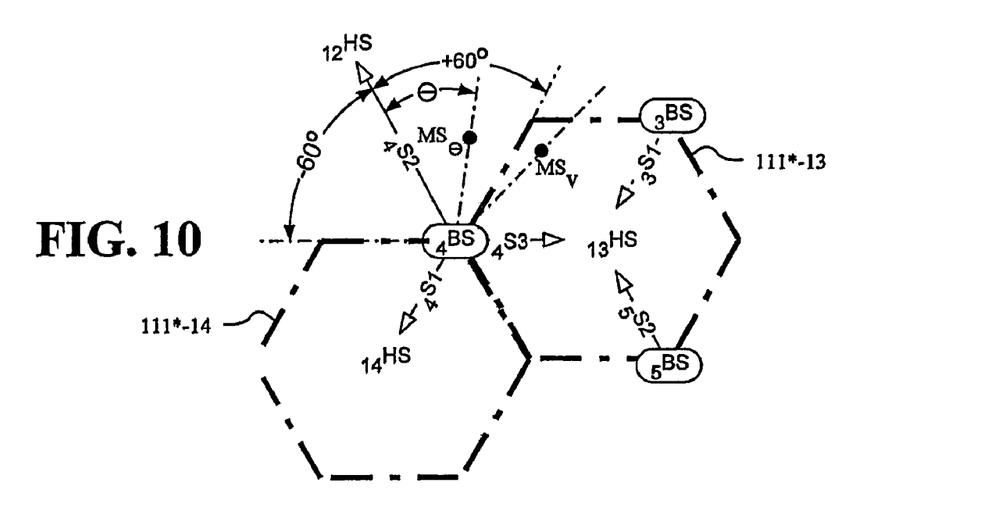
FIG. 10 depicts the geometry used to explain interference attenuation.

FIG. 10 depicts the geometry that is useful in explaining the interference attenuation. In FIG. 10, an $MS_\Theta$ subject to interference forms an angle, $\Theta$, between its position and the boresite axis along $_4S2$ of the interfering adjacent sector antenna pattern. In FIG. 10, the interference from sector antenna $_4S2$ (see FIG. 8 and FIG. 10) for $MS_V$ in the virtual cell **111\*-13** is typical. The $MS_V$ is subject to an interfering signal I with a sector antenna gain $G(\Theta)$ from the sector antenna $_4S2$.

Figure 11:
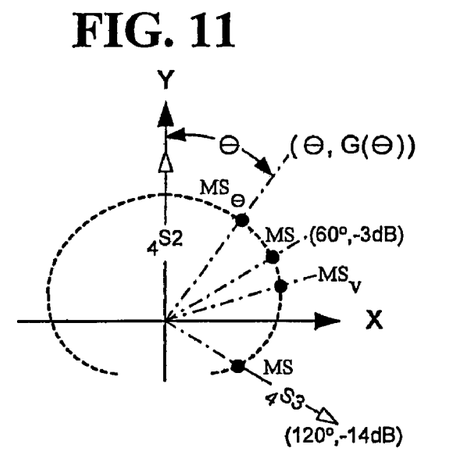
FIG. 11 depicts a typical sector antenna gain patterns.

FIG. 11 depicts the typical sector antenna gain pattern for the sector antenna gain $G(\Theta)$ for angles of $\Theta$ over a range from more than +/−120° measured from the boresite axis (Y) of the antenna $_4S2$. The antenna gain $G(\Theta)$ at angle $\Theta$ for $MS_\Theta$ is designated as the parameter pair $(\Theta, G(\Theta))$. At the edge of the virtual cell midway between $_4S2$ and the $_4S3$ axes where $\Theta=60°$, the interference from antenna $_4S2$ is attenuated by 3 dB and the parameter pair is (60°, −3 dB). At $\Theta=120°$, corresponding to a MS lying along the boresite axis at $_4S3$ of its home virtual cell **111\*-13**, the interference from antenna $_4S2$ is attenuated by 14 dB, that is, the parameter pair is (120°, −14 dB).

Figure 12:
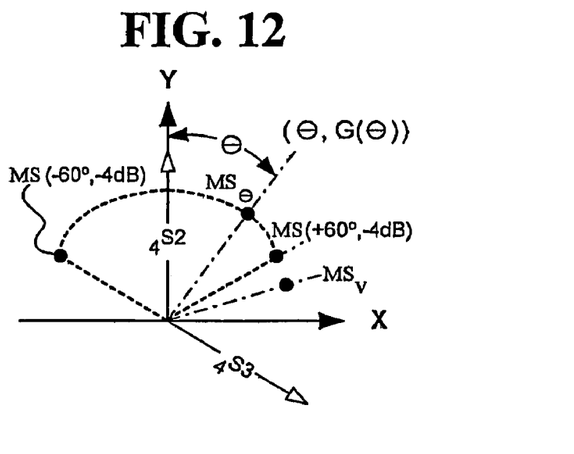
FIG. 12 depicts an antenna gain pattern for an ideal antenna.

FIG. 12 depicts an optimized antenna pattern where the adjacent sector interference is attenuated by 4 dB, or more, at the boundary of the virtual cell, that is, (60°, −4 dB) and (−60°, −4 dB). Because optimized antenna radiates no (or little) power beyond absolute value of $\Theta >\pm60°$, there is no (or little) adjacent sector interference within the boundaries of the home virtual cell **111\*-13 from the adjacent cell antenna $_4S2$. Applied to FIG. 10 by way of example, the antenna $_4S2$ has the optimized pattern of FIG. 12 with a sharp cutoff at the sector boundary (+60°) of cell 111\*-13 whereby interference from the adjacent sector antenna $_4S2$ is minimized so as not to interfere with MSs, such as $MS_V$, in virtual cell 111\*-13**. Optimized antennas with optimized patterns for reducing radiation beyond cell boundaries enhance virtual cell performance for the entire network of cells.

The second mitigation factor relates to the relationship of shadow fading on the desired signal, C, received at the MS and the interference (I) experienced by the MS. Shadow fading results from partial signal blockages, due to physical obstructions of the signal propagation path, between transmitter (BS) and receiver (MS), resulting in an attenuation of the received signal. In the virtual cell mode of operation, the sources of the adjacent sector interference are co-located with the home BS/sector. Applied to FIG. 10 by way of example, the sources of the adjacent sector interference for virtual cell **111\*-13 are $_4S1$ and $_4S2$. Thus, the signals C from $_4S3$ and I from $_4S1$ and $_4S2$ received at the $MS_V$ in virtual cell 111\*-13** experiences highly correlated same shadow fading attenuation. In contrast, for a conventional 1/1 frequency reuse system, the interference sources and desired signal source originate from BSs which are physically located in different sites and hence have highly uncorrelated shadow fading attenuation patterns.

From the perspective of system performance of the wireless cellular systems operating in virtual cell mode, the single most important parameter is the ratio C/I. That ratio determines the quality of the link observed by the users of the system and provides a means of determining system impact on users. Both C and I can be expressed analytically in the form C=SF×C' and I=S×I'. Here, SF represents the shadow fading attenuation and C' and I' represent C and I, respectively, without the shadow fading effect For correlated C and I, the shadow fading factor, SF, appearing in both numerator and denominator of the ratio C/I, is the same and therefore is canceled, that is, it has no affect on the ratio C/I. The cancellation occurs only for virtual cell operation and not for conventional operation.

As a MS ranges through the topography of its home sector, shadow fading effects cause a large range of received power levels in the C and I signals. For the conventional 1/1 system, the corresponding variation of C/I ratios is large. For the virtual cell system, the C/I ratio variations, due to shadow fading, are zero. From the perspective of user link quality, the ratio of the C and I received at the MS should be above an arbitrary minimum C/I threshold as often as possible. Similarly, from a system-wide performance perspective, it is desired to maintain as many users as possible, as often as possible, above an arbitrary minimum C/I threshold. However, for the conventional 1/1 system the wide range of C/I values produced by the shadow fading makes this objective difficult while for the virtual cell system this objective is much easier to attain as is apparent from comparison of FIG. 13 and FIG. 14.

Figure 13:
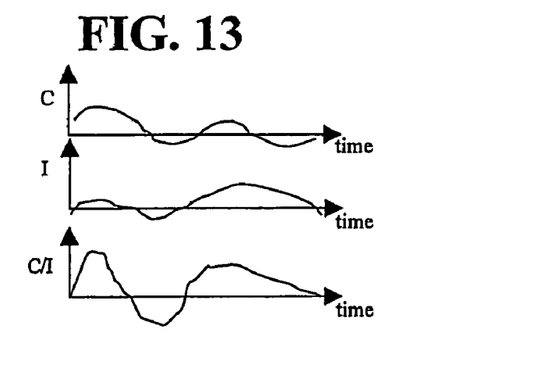
FIG. 13 represents interference zone shadow fading for operation in conventional mode.

FIG. 13 represents interference zone shadow fading typical of operation in a conventional mode. Note the large variation in C/I.

Figure 14:
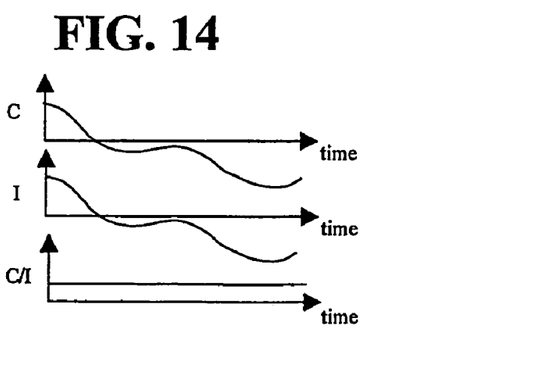
FIG. 14 represents interference zone shadow fading for operation in virtual cell mode.

FIG. 14 represents interference zone shadow fading for operation in virtual cell mode. Note that C/I is constant.

Figure 15:
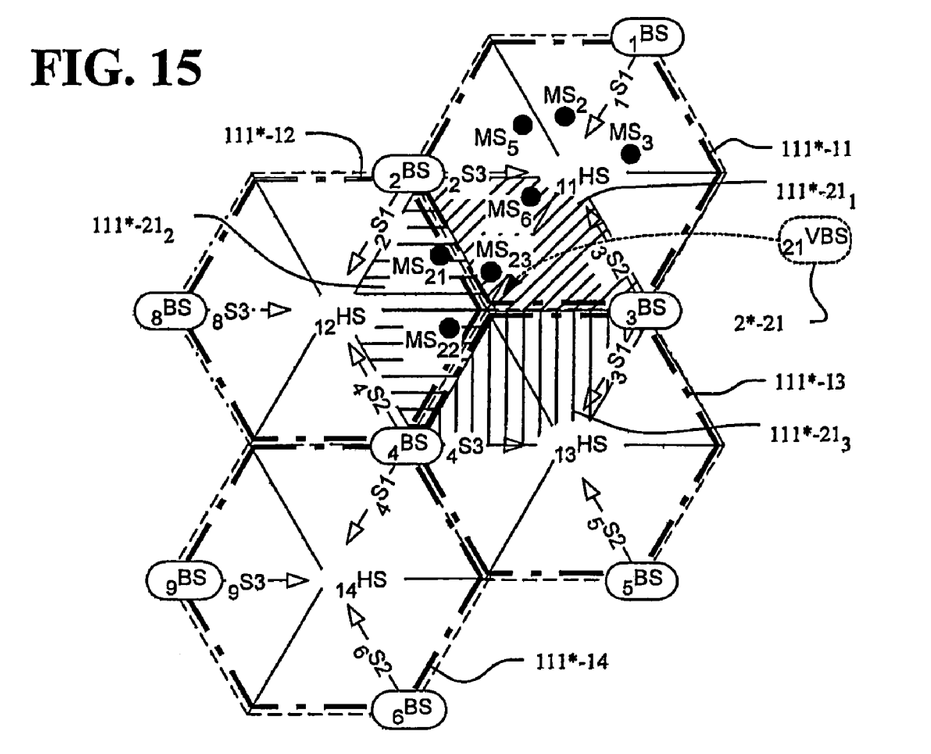
FIG. 15 depicts virtual cells used for frequency hopping management with segmented virtual base stations.

FIG. 15 depicts the virtual cells 111* of FIG. 5, including virtual cells 111*-11, 111*-12, 111*-13 and 111*-14 further partitioned, by way of example, into a segmented virtual cell 111*-21 including cell segments 111*-$21_1$, 111*-$21_2$ and 111*-$21_3$. The segmented virtual cell 111*-21 is served by virtual base station 2*-21 denominated as $_{21}$VBS which includes the virtual base station segments 2*-$21_1$, 2*-$21_2$, and 2*-$21_3$ denominated as $_{21}VBS_{s1}$, $_{21}VBS_{s2}$ and $_{21}VBS_{s3}$, respectively. The segment 111*-$21_1$ is served by the hopping sequence $_{11}$HS employed by base station $_2$BS on antenna $_2$S3 and employed by base station $_3$BS on antenna $_3$S2. The segment 111*$21_2$ is served by the hopping sequence $_{12}$HS employed by base station $_2$BS on antenna $_2$S1 and employed by base station $_4$BS on antenna $_4$S2. The segment 111*-$21_3$ is served by the hopping sequence $_{13}$HS employed by base station $_3$BS on antenna $_3$S1 and employed by base station $_4$BS on antenna $_4$S3. The sector antennas for each of the segments share a common hopping sequence number.

Figure 16:
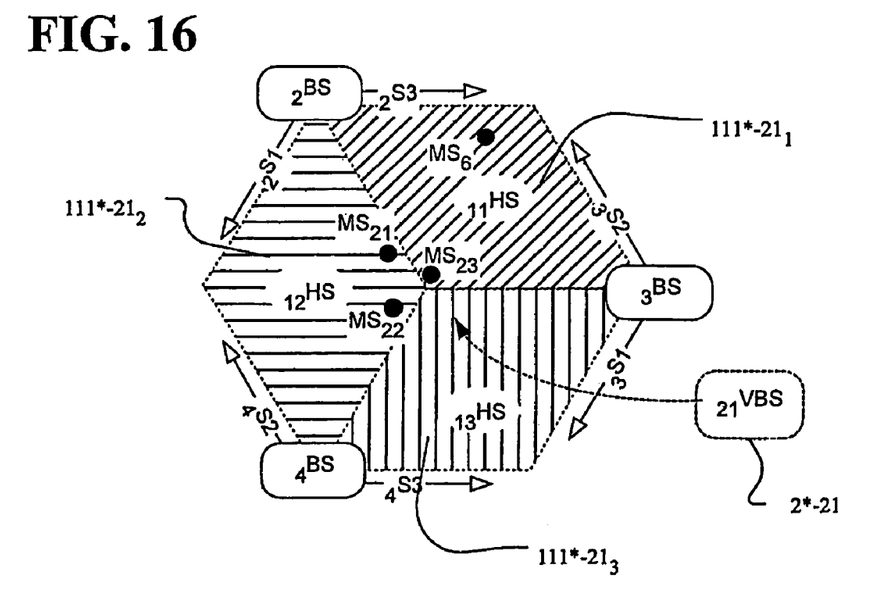
FIG. 16 depicts an expanded view of one of the segmented virtual base stations and virtual cell segments of FIG. 15.

FIG. 16 depicts the segmented cell 21 VBS of FIG. 15 in greater detail. In the FIG. 15 and FIG. 16 example, the initial set up and assignment of MSs to sectors, $MS_6$ and $MS_{23}$ might appropriately be assigned to sector 111*-$21_1$ using hopping sequence $_{11}$HS. With such a setup, FMS switching of $MS_6$ and $MS_{23}$ can occur between $_2$BS and $_3$BS without collisions because of the common $_{11}$HS. Similarly, $MS_{21}$ and $MS_{22}$ might appropriately be assigned to sector 111*-$21_2$ using hopping sequence $_{12}$HS. With such a setup, FMS switching of $MS_{21}$ and $MS_{22}$ can occur between $_2$BS and $_4$BS without collisions because of the common $_{12}$HS. Alternatively, $MS_{21}$, $MS_{22}$ and $MS_{23}$ all can be assigned to sector 111*-$21_2$ using hopping sequence $_{12}$HS. In this way, the interference to and by $MS_{23}$ relative to $MS_{21}$ and $MS_{22}$ is reduced since they all use orthogonal frequencies.

Expression Exp. (1) above applies to the virtual base stations 2*-21 of FIG. 15 as shown by the following TABLE 3 when using the physical sector antennas and elements $_{b1}S(s1)$, $_{b2}S(s2)$, $_{b3}S(s3)$ used in FIG. 4 and the virtual partitioning of FIG. 8. In FIG. 15, the virtual base station $_{21}$VBS is programmed such that the physical sector antennas and elements $_{b1}S(s1)$, $_{b2}S(s2)$, $_{b3}S(s3)$ from FIG. 5 when employed in FIG. 6 use the same hopping sequences of FIG. 5, namely, hopping sequences $_{11}$HS, $_{12}$HS and $_{13}$HS, respectively, and different offsets therefor, namely offsets $_{11}MAIO\{k_{11}\}$, $_{12}MAIO\{k_{12}\}$ and $_{13}MAIO\{k_{13}\}$.

TABLE 3

| $_{L(21)}VBS_s$ | $_{b1}S(s1)$, $_{b2}S(s2)$, $_{b3}S(s3)$ | $_{L(b)}HS$ | $_{L(b)}MAIO\{k_{L(b)}\}$ |
|---|---|---|---|
| $_{21}VBS_{s1}$ | $_3S2$, $_2S3$ | $_{11}HS$ | $_{11}MAIO\{k_{11}\}$ |
| $_{21}VBS_{s2}$ | $_2S1$, $_4S2$ | $_{12}HS$ | $_{12}MAIO\{k_{12}\}$ |
| $_{21}VBS_{s3}$ | $_3S1$, $_4S3$ | $_{13}HS$ | $_{13}MAIO\{k_{13}\}$ |

System Operation. The wireless system of FIG. 1 operates in a conventional mode in which the base stations 2 are unsynchronized, operates in a fast macrodiversity switching (FMS) mode in which base stations are synchronized and in which dedicated channels are switched among base stations under control of base station managers, operates in a coordinated orthogonal frequency hopping (COFH) mode in which two or more sectors forming a virtual cell are synchronized and operates in a combined mode of FMS and COFH in which two or more macrodiverse sectors forming virtual cells are synchronized.

The FIG. 4 configuration represents the conventional mode in which the base stations 2 are unsynchronized. The FIG. 8 and FIG. 15 configurations represent the coordinated orthogonal frequency hopping (COFH) mode in which virtual cells have coordinated orthogonal frequency hopping.

Further and Other Embodiments. Embodiments of the hopping management means 138 of FIG. 3 have been described as distributed in each of the macrodiverse base stations 2. However, other embodiments have the hopping management functions centralized or partially centralized in the base station controller 16-1 of FIG. 1. The choice of the location of the hopping management functions is a matter of design choice. Similarly, the hopping sequence control 116 has been described as centralized in the base station controller 16-1 of FIG. 8. However, other embodiments have the hopping sequence control functions decentralized or partially decentralized in the base stations 2 of FIG. 8. The choice of the location of the hopping sequence control functions is a matter of design choice.

The virtual cells have been described in connection with plural base stations and corresponding plural physical cells where the different base stations operate, at least in part, with coordinated frequency hopping sequences. While one typical embodiment has three sectors per cell, the number of sectors per cell for any particular embodiment is a mater of design choice. An important relationship in the various embodiments is that two or more base stations are operated, at least in part, using coordinated orthogonal frequency hopping sequences. Such a relationship is implemented with 1, 2, 3, 4 or more physical sectors per base station. With the number of sectors equal to 1, the entire cell comprises a single "sector". The number of sectors per base station can be uniform or non-uniform from cell to cell. In a uniform embodiment, all base stations have the same number of sectors, for example, 1, 2, 3, 4 or more sectors per cell. In a non-uniform embodiment, one or more base stations have 1, 2, 3, 4 or more sectors per cell while one or more other ones of the base stations have a different number of 1, 2, 3, 4 or more sectors per cell. The hopping sequence control means that controls the frequency hopping sequences of adjacent ones of the base stations is aware of the sector facilities and other capabilities of each of the base stations so that the base stations operate with coordinated frequency hopping sequences. When the sectorization is uniform from cell to cell, the control algorithms for coordinated frequency hopping sequences are simplified. When the sectorization is non-uniform from cell to cell, the ability to tailor the sector layouts for coordinated frequency hopping sequences is enhanced.

While the invention has been particularly shown and described with reference to preferred embodiments thereof it will be understood by those skilled in the art that various changes in form and details may be made therein without departing from the scope of the invention.

The invention claimed is:

1. A system for wireless mobile communications, the system comprising:
    at least a first virtual cell including at least one sector from each of at least three adjacent base stations, each of the at least three adjacent base stations comprising a cell region partitioned into at least three sectors, the at least three adjacent base stations adapted to communicate with at least one mobile station via coordinated orthogonal frequency hopping sequences, and
    hopping sequence control means for controlling said coordinated orthogonal frequency hopping sequences in said at least first virtual cell by employing a single hopping sequence number and a set of mobile allocation index offsets in said at least first virtual cell, wherein said single hopping sequence number and said set of mobile allocation index offsets in the sectors comprising said at least first virtual cell is different from a hopping sequence number and a set of mobile allocation index offsets associated with sectors of said at least three adjacent base stations outside said at least first virtual cell.

2. The communication system of claim 1 wherein each of said base stations includes hopping management means for managing communications between said mobile stations and said base stations using said coordinated orthogonal frequency hopping sequences.

3. The communication system of claim 1 wherein said hopping sequence control means is included in a base station controller.

4. The communication system claim 1 wherein said hopping sequence control means is included in a base station controller and wherein each of said base stations includes base station timing means for controlling the timing of said of communications with mobile stations and wherein said base station controller includes controller timing means for synchronizing the timing of said base station timing means in said plurality of base stations.

5. The communication system of claim 4 wherein said sectors have optimized sector antennas with sharp cutoff at sector boundaries whereby interference from adjacent sectors is minimized.

6. The communication system of claim 1 wherein said hopping sequence control means controls said frequency hopping sequences with 1/1 frequency reuse.

7. The communication system of claim 6 wherein said the base stations employ broadcast channels and dedicated channels for said communications with the mobile stations and wherein said communication system includes fast macrodiversity switching management means for adaptively switching dedicated channels among said base stations while said broadcast channels remain unswitched.

8. The communication system of claim 1 wherein said base stations are located at macrodiverse locations and employ broadcast channels and dedicated channels for said communications with the mobile stations and wherein said communication system includes fast macrodiversity switching management means for adaptively switching dedicated channels among said base stations while said broadcast channels remain unswitched.

9. The communication system of claim 1 wherein each of said base stations includes a base station manager comprising: a macrodiversity processor for processing modules including fast macrodiversity switching means, hopping management means and timing means, a database for storing hoping sequence numbers and sets of mobile allocation index offsets, resource and airlink control means for controlling downlink signals to said mobile stations and for controlling uplink signals from said mobile stations, interface means for interfacing communications among said base stations and the hopping sequence control means.

10. The communication system of claim 1 wherein each of said base stations includes a base station manager for managing fast macrodiversity switching and coordinated orthogonal frequency hopping.

11. The communication system of claim 1 wherein, each of said base stations includes a base station manager, said plurality of base stations includes a home base station and one or more assistant base stations, said home base station includes a home base station manager for controlling dedicated channels for particular mobile stations, said one or more assistant base stations each including an assistant base station manager for controlling dedicated channels for ones of said mobile stations switched to said one or more assistant base stations.

12. The communication system of claim 1 wherein said communications are TDMA.

13. The communication system of claim 12 wherein said communications use a GSM protocol.

* * * * *